F. A. NEIDER, DEC'D.
CARR FASTENER COMPANY, ASSIGNEE,
VEHICLE CURTAIN FASTENER.
APPLICATION FILED NOV. 26, 1918.

Reissued Apr. 1, 1919.

14,626.

Inventor:
Fred A. Neider.
by Emery, Booth, Janney & Varney.
Attys.

UNITED STATES PATENT OFFICE.

FRED A. NEIDER, DECEASED, LATE OF AUGUSTA, KENTUCKY; BY THE ASSIGNEE, CARR FASTENER COMPANY, OF CAMBRIDGE, MASSACHUSETTS, A CORPORATION OF MAINE.

VEHICLE-CURTAIN FASTENER.

14,626. Specification of Reissued Letters Patent. Reissued Apr. 1, 1919.

Original No. 1,234,791, dated July 31, 1917, Serial No. 130,449, filed November 9, 1916. Application for reissue filed November 26, 1918. Serial No. 264,249.

*To all whom it may concern:*

Be it known that FRED A. NEIDER, late a citizen of the United States of America, and resident of Augusta, in the county of Bracken and State of Kentucky, invented a new and useful Improvement in Vehicle-Curtain Fasteners, of which the following is a specification.

An object of the invention is to produce a vehicle curtain fastener which will be locked positively against displacement from its curtain fastening position upon any but a certain displacing movement being exerted upon the fastener, the displacing movement being one not given the fastener by any motion of the vehicle or of the curtain.

A further object of the invention is to produce an improved vehicle curtain fastener in which a short stud may be utilized.

A further object is to produce a vehicle curtain fastener in which the socket of the fastener fits snugly against the member to which the stud is secured.

These and other objects are attained in the vehicle curtain fastener described in the following specification and illustrated in the accompanying drawings, in which.

Figs. 6 to 9 inclusive are perspective views of details of the socket member embodying the invention.

Figure 1:
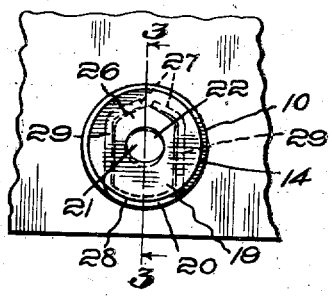
Figure 1 is a front elevation of a vehicle curtain fastener embodying the invention.
Figure 2:
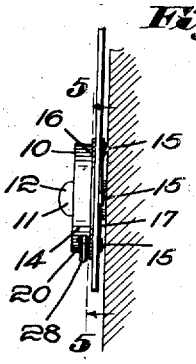
Fig. 2 is a side elevation of the curtain fastener illustrated in Fig. 1.
Figure 5:
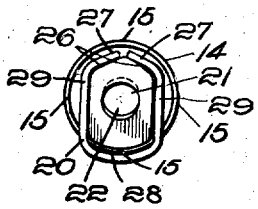
Fig. 5 is a sectional view taken on the line 5—5 of Fig. 2.
Figure 6:
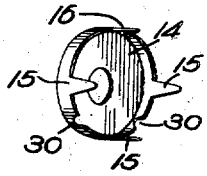
Figure 7:
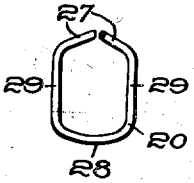
Figure 8:
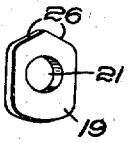
Figure 9:
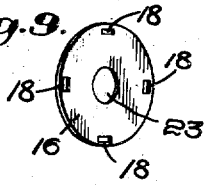
Figure 3:
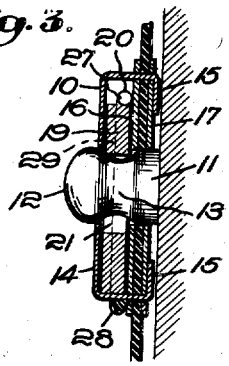
Fig. 3 is an enlarged sectional view taken on the line 3—3 of Fig. 1, showing the fastener in its curtain fastening position.

The fastener embodying the invention consists of socket and stud members 10 and 11 respectively. The socket consists of a shell 14 having prongs 15 extending therefrom for attachment to the curtain, washers 16 and 17 being provided for reinforcing the curtain by being located on each side of it and having slots 18 for permitting of the passage of the prongs therethrough. Within the shell are located a lock bolt or wedge 19 and a spring 20 for controlling the movement of the wedge. The wedge is provided with an aperture 21 adapted to receive the stud, the shell, washers and curtain also being provided with apertures, 22, 23, 24 and 25 respectively for permitting passage therethrough of the stud. The wedge is of a shape such as disclosed in Fig. 8, the front thereof being provided with a point 26 against which the ends 27 of the similarly shaped wire spring 20 engage. In locating the spring in position, the base 28 thereof is located outside the rim of the shell as disclosed, the legs 29 of the spring passing through notches 30 formed in the flange of the shell. The bolt or wedge 19 is located wholly within the shell and between legs 29 and the ends 27 of the wire spring, the point of the wedge being located in position to expand the spring when forced against its ends 27. Normally the pressure exerted by the ends 27 on the inclined faces of the wedge, hold the opposite end of the wedge in engagement with the inner surface of the rim as disclosed in Figs. 3 and 5, this position being such that the opening 21 formed in the wedge is held out of alinement with the opening in the shell and the coöperating openings in the washers and in the curtain. In this position the wedge will be forced toward the ends 27 in passing the socket over the stud, the curved surface of the end of the stud bringing it to such a position that its aperture 21 is in alinement with the apertures 22 to 25 inclusive. After passage of the socket over the stud the wedge is forced to engage the restricted neck 13 of the stud by the ends 27 forcing it downwardly as disclosed in Fig. 3. The undersurface of the stud being tapered, causes the wedge in its downward movement to force the socket against the member to which the stud is secured, and locks the socket in position on the stud.

Figure 4:
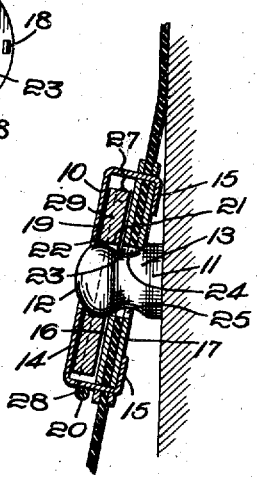
Fig. 4 is a view of the fastener similar to that of Fig. 3, but showing the position the fastener assumes in moving it to its curtain disengaging position.

In order to remove the socket it is necessary to grasp the lower portion thereof and to tilt it as disclosed in Fig. 4, the wedge being forced to ride up the incline of the tapered under surface of the headed end of the stud to release the socket therefrom, the top portion of the socket during this movement, bearing against the member to which the stud is secured. This moves the wedge to the position disclosed in Fig. 4 in which all of the apertures 21 and 25 inclusive are moved into alinement with one another to permit disengagement of the socket from the stud.

It is only in the above described operation that the socket can be disengaged from the stud, it being difficult to remove the socket in any other manner since to attempt to disengage it by a side pull or a pull from the top, would cause the socket to bind on the stud and to bring its wedge into such a position with relation to the inclined under surface of the headed end of the stud as to prevent reciprocation of the wedge to disengage the socket from the stud. Furthermore, attention is called to the fact that the surface of the object to which the stud is secured, is used as a fulcrum for causing operation of the wedge during disengaging movement of the socket. This frees all portions of the stud back of the under surface of the head, from any wedge moving effect.

Having thus described the invention, what is claimed is:

1. A socket for vehicle curtain fasteners comprising a shell having an aperture formed therein adapted to receive a headed stud, a wedge located within the shell and having an aperture therein, said wedge being adapted to be reciprocated within the shell to bring its aperture into and out of alinement with the aperture in the shell, and a spring embracing the wedge, adapted normally to retain the wedge in position with its aperture out of alinement with that in the shell and to have its ends sprung apart when the wedge is reciprocated to bring its aperture in alinement with the aperture of the shell to receive the stud.

2. A socket for vehicle curtain fasteners comprising a socket consisting of a shell having an aperture located therein and prongs extending therefrom, a stud-engaging bolt reciprocally mounted within the shell and having an aperture therein adapted to be moved into and out of alinement with the aperture in the shell when the bolt is moved, and a substantially U-shaped spring having its central portion located outside the shell and its branches extending to the interior of the shell and embracing the bolt, said bolt and branches being so shaped as to maintain the bolt with its aperture out of alinement with the aperture in the shell, said prongs being adapted to pierce the material of the curtain to which the socket is to be secured, and washers adapted to reinforce the curtain material and having apertures formed therein in alinement with the aperture of the shell.

3. A snap fastener comprising, in combination, a stud having a head and a neck providing therebetween a sloping shoulder; a socket including a casing and a movable jaw element extending transversely thereof, adapted to engage said shoulder behind said head and to prevent separation of stud and socket by rectilinear separation and by relative tipping movement on three sides, while permitting such separation by relative tipping movement on the fourth side.

4. A snap fastener comprising, in combination, a stud having a head and a neck; a socket including a casing and a slidable jaw element, and spring means urging said jaw element into engagement with said stud behind said head, said jaw element extending transversely of said socket and preventing separation of stud and socket by rectilinear separation and by relative tipping movement on three sides, while permitting such separation by relative tipping movement on the fourth side.

5. In a snap fastener, a stud, a casing containing a jaw, and spring means for pressing said jaw into engaged relation to said stud, said spring means providing two angled terminal portions on opposite sides of said casing, wedge means, said angled terminal portions engaging opposed faces of said wedge means thereby to spring said terminal portions in opposite directions one relative to the other.

6. A snap fastener comprising, in combination, a stud having a head and a neck; a socket for engagement with said stud and including a casing and a slidable spring-pressed sheet metal jaw for engagement with said neck, said jaw and casing preventing relative tipping movement of stud and socket on three sides while permitting relative tipping movement thereof on the fourth side to effect retraction of said jaw and thereby to permit separation of stud and socket.

7. In a socket for snap fasteners, a casing and a jaw element slidable therein, spring elements positioned on opposite sides of said jaw element and engaging one end of said jaw element in wedge relationship, whereby lateral spring force of said spring elements is converted into longitudinal spring force effective to shift said jaw element longitudinally.

8. In a socket for snap fasteners, a casing and a jaw element slidable therein, spring elements positioned on opposite sides of said jaw element and engaging one end of said jaw element in wedge relationship, whereby lateral spring force of said spring elements is converted into longitudinal spring force effective to shift said jaw element longitudinally while guided laterally by said spring elements.

9. In a snap fastener, a casing, a jaw element slidable longitudinally therein and spring elements on opposite sides of said jaw element and providing lateral guiding surfaces for said jaw element.

10. In a snap fastener, a casing, a jaw element slidable longitudinally therein and having a wedge-shaped end and spring elements engaging said end positioned to be wedged apart thereby, said spring elements being angled but in lesser degree than the angle of said wedge-shaped end.

FRED A. NEIDER,
By FRED S. CARR,
*President of Carr Fastener Company, assignee, by mesne assignments, of the entire interest in the invention.*